US008230117B2

(12) United States Patent
Daly, Jr. et al.

(10) Patent No.: US 8,230,117 B2
(45) Date of Patent: Jul. 24, 2012

(54) TECHNIQUES FOR WRITE-AFTER-WRITE ORDERING IN A COHERENCY MANAGED PROCESSOR SYSTEM THAT EMPLOYS A COMMAND PIPELINE

(75) Inventors: George William Daly, Jr., Austin, TX (US); Guy Lynn Guthrie, Austin, TX (US); Ross Boyd Leavens, Cary, NC (US); Joseph Gerald McDonald, Raleigh, NC (US); Michael Steven Siegel, Raleigh, NC (US); William John Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/420,889

(22) Filed: Apr. 9, 2009

(65) Prior Publication Data
US 2010/0262720 A1 Oct. 14, 2010

(51) Int. Cl.
*G06F 3/00* (2006.01)
(52) U.S. Cl. ...................... 710/5; 710/6; 710/7
(58) Field of Classification Search .............. 710/5–7
See application file for complete search history.

(56) References Cited

U.S. PATENT DOCUMENTS

| | | | |
|---|---|---|---|
| 5,542,058 A | 7/1996 | Brown, III et al. | |
| 5,864,712 A * | 1/1999 | Carmichael et al. | 710/20 |
| 6,240,508 B1 | 5/2001 | Brown, III et al. | |
| 7,266,619 B2 * | 9/2007 | Karaorman | 710/22 |
| 7,437,521 B1 | 10/2008 | Scott et al. | |
| 2003/0233154 A1 * | 12/2003 | Kobziar | 700/13 |
| 2006/0095741 A1 | 5/2006 | Asher et al. | |

OTHER PUBLICATIONS

Ibrahim Hur et al., Memory Scheduling for Modern Microprocessors, ACM Transactions on Computer Systems, vol. 25, No. 4, Article 10, Dec. 2007.
Roman Lysecky et al., Prefetching for Improved Bus Wrapper Performance in Cores, ACM Transactions on Design Automation of Electronic Systems, vol. 7, No. 1, Jan. 2002, pp. 58-90.
Ibrahim Hur et al., Adaptive History-Based Memory Schedulers, Proceedings of the 37th International Symposium on Microsrchitecture, IEEE 2004.
Engin Ipek et al., Self-Optimizing Memory Controllers: A Reinforcement Learning Approach, International Symposium on Computer Architecture, IEEE 2008.

* cited by examiner

*Primary Examiner* — Chun-Kuan Lee
(74) *Attorney, Agent, or Firm* — Yudell Isidore Ng Russell PLLC

(57) ABSTRACT

A technique for maintaining input/output (I/O) command ordering on a bus includes assigning a channel identifier to I/O commands of an I/O stream. In this case, the channel identifier indicates the I/O commands belong to the I/O stream. A command location indicator is assigned to each of the I/O commands. The command location indicator provides an indication of which one of the I/O commands is a start command in the I/O stream and which of the I/O commands are continue commands in the I/O stream. The I/O commands are issued in a desired completion order. When a first one of the I/O commands does not complete successfully, the I/O commands in the I/O stream are reissued on the bus starting at the first one of the I/O commands that did not complete successfully.

20 Claims, 7 Drawing Sheets

TECHNIQUES FOR WRITE-AFTER-WRITE ORDERING IN A COHERENCY MANAGED PROCESSOR SYSTEM THAT EMPLOYS A COMMAND PIPELINE

This invention was made with United States Government support under Agreement No. HR0011-07-9-0002 awarded by DARPA. The Government has certain rights in the invention.

BACKGROUND

1. Field

This disclosure relates generally to a coherency managed processor system and, more specifically, to techniques for write-after-write ordering in a coherency managed processor system that employs an input/output command pipeline.

2. Related Art

While various architectures have memory models that are relaxed with respect to write ordering to different addresses, at least some architectures (e.g., the PowerPC™ architecture) require stronger ordering for input/output (I/O) operations. For example, in an I/O operation that involves updating one or more data blocks in a memory (e.g., a cache memory or a main memory) and then writing a control block (that is examined by a processor thread that is to receive the one or more data blocks) to indicate when the I/O operation is complete, the update of the one or more data blocks must complete before the control block update to maintain program integrity. In a sequential operation bus (i.e., in an architecture where only one operation occurs at a time), a control block cannot generally be updated before one or more associated data blocks are updated.

For example, in an architecture that employs a sequential operation bus, a master issues an initial write command, waits for confirmation of a completion of the initial write command, and then issues a next write command. However, in a conventional system that implements a coherent transport bus that is optimized for a weak ordering model (i.e., ordering is required only for accesses to a same address) with distributed coherency management, a stream of I/O commands with strong write-after-write ordering may not fully take advantage of the pipelined and distributed nature of the system. For example, a master cannot control a completion status of commands the master issues to a coherent transport bus. As such, if a command in a middle of a command stream fails, subsequent commands may complete and violate a desired completion order.

SUMMARY

According to one aspect of the present disclosure, a technique for maintaining input/output (I/O) command ordering on a bus includes assigning a channel identifier to I/O commands of an I/O stream. In this case, the channel identifier indicates the I/O commands belong to the I/O stream. A command location indicator is also assigned to each of the I/O commands. The command location indicator provides an indication of which one of the I/O commands is a start command in the I/O stream and which of the I/O commands are continue commands in the I/O steam. The I/O commands are issued in a desired completion order. When a first one of the I/O commands does not complete successfully, subsequent ones of the I/O commands in the I/O stream are prevented from completing successfully. The I/O commands that did not complete successfully are then reissued on the bus starting at the first one of the I/O commands that did not complete successfully.

According to another aspect of the present disclosure, a technique for assigning input/output (I/O) stream transactions includes determining whether a received new I/O stream transaction is associated with one or more active I/O streams. When the new I/O stream transaction is associated with one of the one or more active I/O streams, a first channel identifier that is associated with the one of the one or more active I/O streams and an available first service engine are assigned to the new I/O stream transaction. When the new I/O stream transaction is not associated with one of the one or more active I/O streams, an available second channel identifier and an available second service engine are assigned to the new I/O stream transaction.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
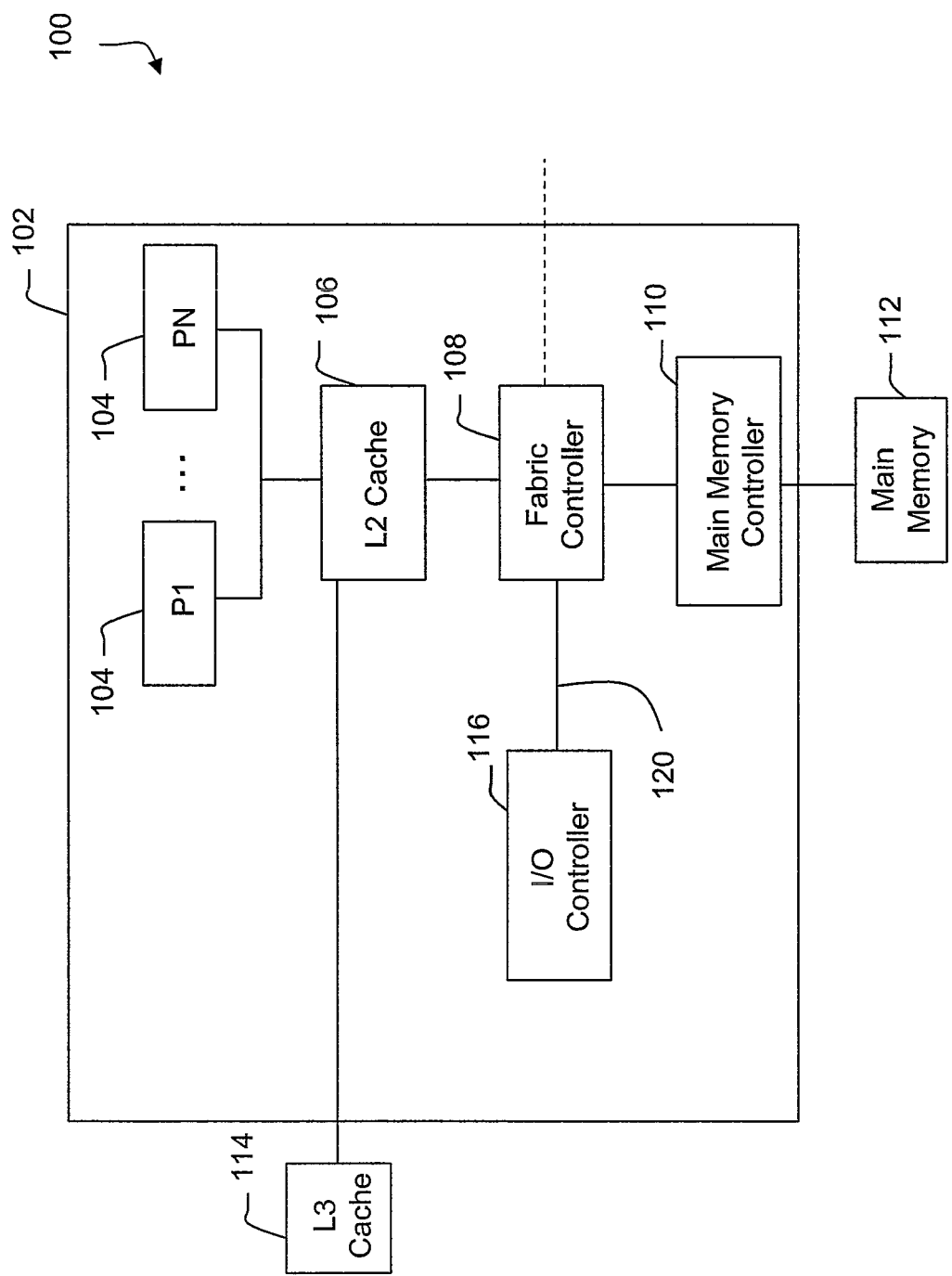
FIG. 1 is a diagram of a relevant portion of an example processor system that may be configured to implement input/output (I/O) operations according to various aspects of the present disclosure.

As will be appreciated by one of ordinary skill in the art, the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system. The present invention may, for example, take the form of a computer program product on a computer-usable storage medium having computer-usable program code, e.g., in the form of one or more design files, embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. As used herein the term "coupled" includes a direct electrical connection between elements or blocks and an indirect electrical connection between elements or blocks achieved using one or more intervening elements or blocks.

According to various aspects of the present disclosure, an architecture is disclosed that is configured to prevent commands (in an I/O flow (stream)) that follow a failed command (in the I/O stream) from violating a desired completion order. According to this aspect of the present disclosure, a master (I/O controller) is configured to mark each write command of a stream with a channel identifier (e.g., cTag.Identifier) and a command location indicator (e.g., cTag.Continue) that indicates whether the command is a 'start' command or a 'continue' command in the stream. The I/O controller (e.g., a direct memory access (DMA) unit) then issues a series of write commands (to a coherent transport bus) in a correct completion order. In various embodiments, commands from different streams may be issued to a coherent transport bus in an interleaved fashion. The bus is then used to distribute the commands (to slaves) in the same order as presented by the I/O controllers (or the order presented by the I/O controllers is logged when the distribution order is different than the presentation order).

Combined response logic (CRL), associated with the bus, collects partial responses (e.g., via a partial response bus) to commands (e.g., sent via a reflected command bus) from responding slaves (e.g., level-2 (L2) caches, memory controllers, etc.) on the bus and distributes a combined response to the responding slaves (e.g., via a combined response bus) for each of the commands. The combined response provides an indication of how the slaves, which snoop the bus, are to handle the command. The CRL also maintains the status (e.g., 'fail' state/'not fail' state in a channel failure indicator (cFail)) of all channel identifiers (also referred to as channel tags) in use by each I/O controller in the system.

The CRL examines a stream status (e.g., as indicated by the channel failure indicator (cFail) and the command location indicator) and the collected partial responses to determine the combined response for the command within the stream and to update cFail if necessary. When cTag.Continue indicates continue and cFail indicates fail, the CRL distributes a failed combined response. When cTag.Continue indicates start, or cFail indicates 'not fail', then a combined response is determined from the collected partial responses and is distributed. When cTag.Continue indicates start, or cFail indicates 'not fail', the cFail may be updated. When cFail indicates 'fail' and the combined response determined from the collected partial responses indicate a 'successful' combined response, cFail is changed to the 'not fail' state. When cFail indicates 'not fail' and the combined response determined from the collected partial responses indicate a 'fail' combined response, cFail is changed to the 'fail' state. In all other cases, cFail is left unchanged.

The combined response (which is determined by examining the partial responses from responding slaves) is distributed to the slaves and masters coupled to the bus in the same order as the commands were issued by the master. The above-described handling of combined response creation and distribution allows an I/O controller to issue a stream of commands that require completion in the same order as issued without waiting for the results of an issued command before issuing a subsequent command. When a command in the stream fails, then all commands following the failing command are also regarded as failing. In at least one embodiment, on detection of a failed command in a stream, the I/O controller restarts the stream at the failing command (i.e., reissues the failed command with a 'start' of stream indication) without waiting for the combined responses for subsequent outstanding commands. As the CRL maintains the order of commands from the I/O controller when evaluating the combined response, an old stream may be flushed from a command pipeline and a 'restart' may follow in the pipeline. The above-described sequence, when implemented in conjunction with ordering rules described below, facilitates the pipelining of a stream of commands that require completion in an order the commands were presented to a bus (e.g., a system bus).

As noted above, a conventional non-streaming approach to completing an ordered command set to different address locations has required an I/O controller to issue a first command (of the ordered command set) and wait until a 'good' combined response is obtained before issuing a next command in the ordered command set. According to various aspects of the present disclosure, an ordered command set (or command stream) is identified using a channel identifier, which is often referred to as a channel tag. In this embodiment, each command of the channel is tagged with additional information indicating that the command is either a 'start' or a 'continuation' of the channel using a command location indicator. When the command location indicator associated with an issued command indicates a 'start' channel, the command and all subsequent commands associated with the channel are treated as a new stream. Commands of a stream may originate from a single service engine or multiple service engines.

The CRL tracks the completion of each command within a channel. Failure of a command within a channel causes the CRL to fail all subsequent commands of the channel until a 'start' channel is again indicated in a channel identifier of a command. Once a fail has been detected by an I/O controller, the I/O controller may immediately restart the channel (cTag.Continue=0) at the failing command.

As noted above, when the CRL detects that a command has failed within a channel, the CRL fails all subsequent commands in the channel until the channel is re-started. In general, a dispatcher within an I/O controller assigns work (commands) to service engines (SEs) based on the requirements of a supported I/O architecture. Typically, one or more SEs are assigned to a channel. In one embodiment, an I/O controller may be assigned up to sixteen channel identifiers and commands of a channel may originate from multiple SEs. As observed by an associated bus, an ordered set of commands is defined as a sequence of commands issued from an I/O controller. When an I/O controller is required to specify the order in which commands are to be executed and completed, the issue order of the I/O controller corresponds to a required execution and completion order.

When an arbiter within the I/O controller selects a channel to issue a command, a service engine associated with the head of the channel examines a status of the channel and its ability to issue a command. When a status of a channel is 'fail' (as indicated by a combined response), a previous command (of the channel) has failed and the channel is restarted (at the failing command) when the I/O controller issues a next command. The I/O controller examines the channel count to ensure that the channel has not exceeded a configured threshold. When the channel count has exceeded the threshold, the arbitration cycle completes without the I/O controller issuing a command. When there are no new commands in a channel, the arbitration cycle completes without the I/O controller issuing a command.

To issue a next command, the I/O controller pulls the next command to be issued from the service engine associated with the head of the channel and the I/O controller issues the next command and increments the channel count. In preparation for the next arbitration cycle, the I/O controller sets cTag.Continue to '1' (i.e., continue) and the channel status (channel.status) to 'active'. For example, a format for an issue command may have the following format: Issue(cmd, txid, cTag.Continue, cTag.Identifier), where 'cmd' is a bus command (e.g., a write), 'cTag.Continue' is a command location indicator and is set to '0' to restart a channel and is set to '1' to continue a current channel, and 'cTag.Identifier' is a channel identifier.

When a combined response indicates an outstanding command has completed successfully, the I/O controller increments a channel index (channel index) that is used to identify a next command to issue, the transaction identifier used by the outstanding command is returned to a free pool, and the channel status is set to 'active'. A failing combined response causes the I/O controller to set the channel status to 'fail' and the channel index (which used to identify the next command to be issued) is set to the index of the next command to complete. In this case, an additional command sequence may be required to complete the I/O operation.

As noted above, once a command is issued by an I/O controller, responding slaves attached to the bus each provide a partial response. The CRL stores the partial responses in a manner that retains the ordering of the command issued by each I/O controller using an approach that is appropriate to an implemented topology. One solution is to maintain the issue order as provided by an I/O controller when broadcasting the command to all slaves, collect the partial response to the command, and place the partial response and command information into a buffer that is serviced in the same order as the command issue order. Commands from multiple I/O controllers may be interleaved, however, the order of a specific service engine retains its command order as seen on the bus. The CRL examines the partial responses and determines if all the partial response results of a command are available for processing. In general, the order of the results matches the broadcast order of the commands and the broadcast order of the commands matches the individual order of commands from each I/O controller.

If there are no partial response results ready for processing, the CRL waits for the necessary partial response results from the slaves to become ready for processing. If the partial responses from all slaves are available, then the CRL examines the partial responses and information about the command, such as a command type (cmd), channel identifier (cTag.Identifier), whether a command is a 'start' command or a 'continue' command (cTag.Continue), and channel status (channel.status). When the command location indicator indicates that a command is a continuation command of a channel and the channel status indicates that the channel is in a 'fail' state, the combined response distributed by the CRL indicates that the command has failed. The channel status specified is then set to a 'fail' state.

When the command location indicator indicates that the command is issued as the start of a channel or the channel status indicates that the channel is not in a 'fail' state, the CRL examines the partial responses collected for the command to determine the combined response. The CRL determines and then distributes the combined response to the slaves that received the command. The combined response indicates failed command execution when the partial response from one or more slaves indicates the command was unable to complete the operation. Successful command execution indicates that the command completed the operation. In general, for successful command execution, data movement occurs, as needed, to complete the command. The service engine examines the combined response to determine if the command failed or was successful. A combined response that indicates a failed execution sets the channel status to the 'fail' state. A combined response that indicates a successful command execution sets the channel status to the 'not fail' state.

With reference to FIG. 1, a relevant portion of an example processor system 100 is illustrated that may handle I/O operations according to one or more of the techniques disclosed herein. The example processor system 100 includes one or more chip-level multiprocessors (CMPs) 102 (only one of which is illustrated in FIG. 1), each of which may include multiple (e.g., two to one-hundred processor cores) processors 104. The CMP 102 may correspond to, for example, a processor node of a computer cluster employed in a high performance computing (UPC) application. The processors 104 may, for example, operate in a simultaneous multithreading (SMT) mode or a single thread (ST) mode. When the processors 104 operate in the SMT mode, the processors 104 may employ multiple separate instruction fetch address registers to store program counters for multiple threads. In at least one embodiment, the processors 104 each include a first level (L1) cache memory (not separately shown in FIG. 1) that is coupled to a shared second level (L2) cache memory (cache) 106, which is coupled to a shared third level (L3) cache 114 and a fabric controller 108.

As is illustrated, the fabric controller 108 is coupled to a memory controller (e.g., included in a Northbridge) 110, which is coupled to a memory subsystem 112. The memory subsystem 112 includes an application appropriate amount of volatile and non-volatile memory. The fabric controller 108 facilitates communication between different CMPs and between the processors 104 and the memory subsystem 112 and, in this manner, functions as an interface. It should be appreciated that the various techniques disclosed herein are equally applicable to systems that employ separate L2 caches for each processor, as well as systems that employ separate L2 and L3 caches for each processor. Each of the L1, L2, and L3 caches may be combined instruction and data caches or data caches.

Figure 2:
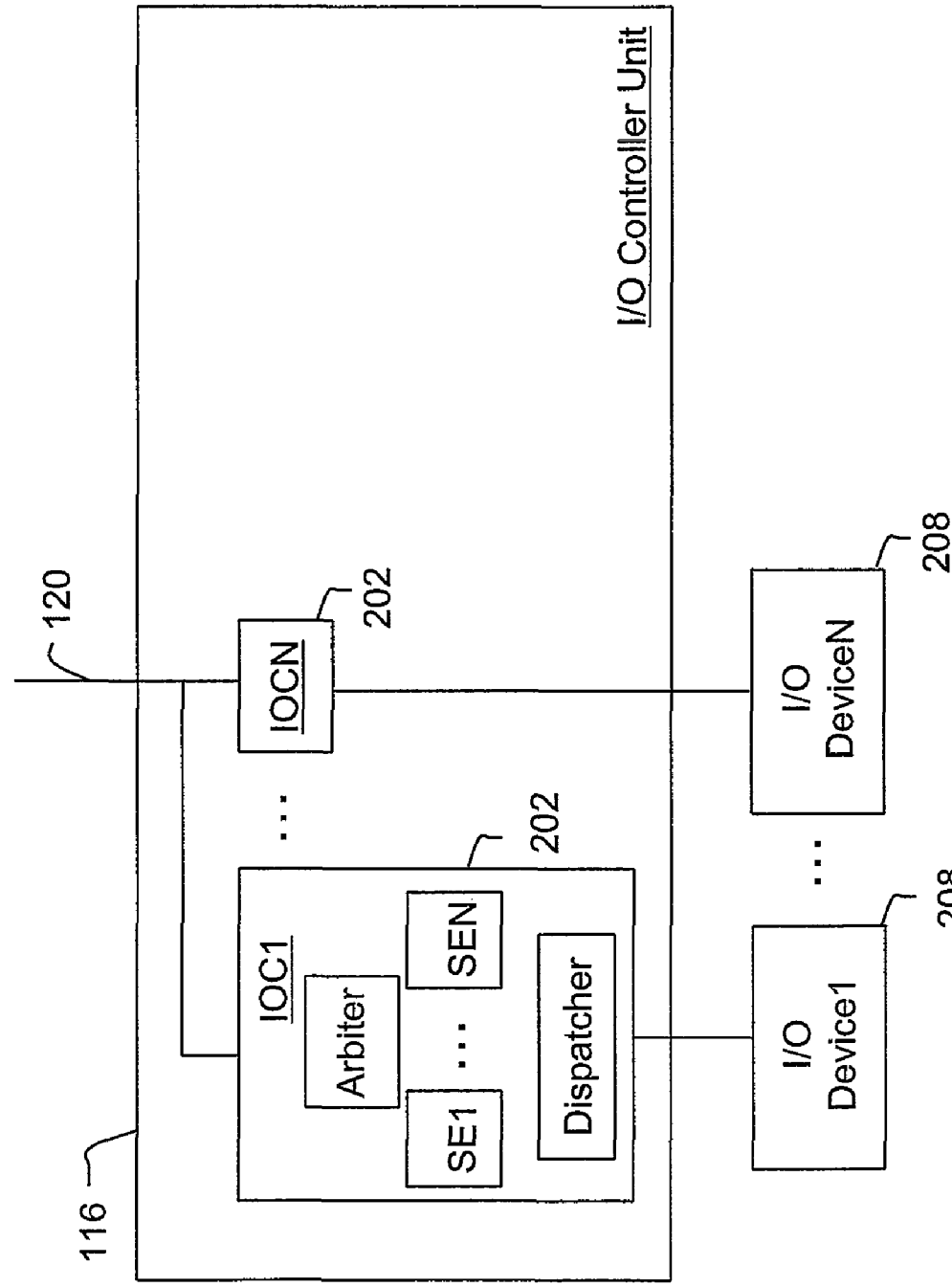
FIG. 2 is a diagram of a relevant portion of an example I/O controller unit that may be employed in the processor system of FIG. 1, according to various embodiments of the present disclosure.

As is shown in FIG. 1, the fabric controller 108 is also coupled to an I/O controller unit (e.g., included in a Southbridge) 116. With reference to FIG. 2, a relevant portion of the I/O controller unit 116 is illustrated. The I/O controller unit 116 includes multiple I/O controllers 202, each of which include a dispatcher, an arbiter, and multiple service engines (SEs) that are assigned to I/O streams provided from I/O devices 208, which may correspond to PCI express bus devices, PCI devices, disk drives, etc. The dispatcher receives commands from the I/O devices 208 and may assign channel identifiers, command location indicators, and service engines to the received commands (see FIGS. 3 and 6). Based upon order requirements, the arbiter chooses between the service engines to present the correctly ordered streams to the fabric controller 108.

Figure 2A:
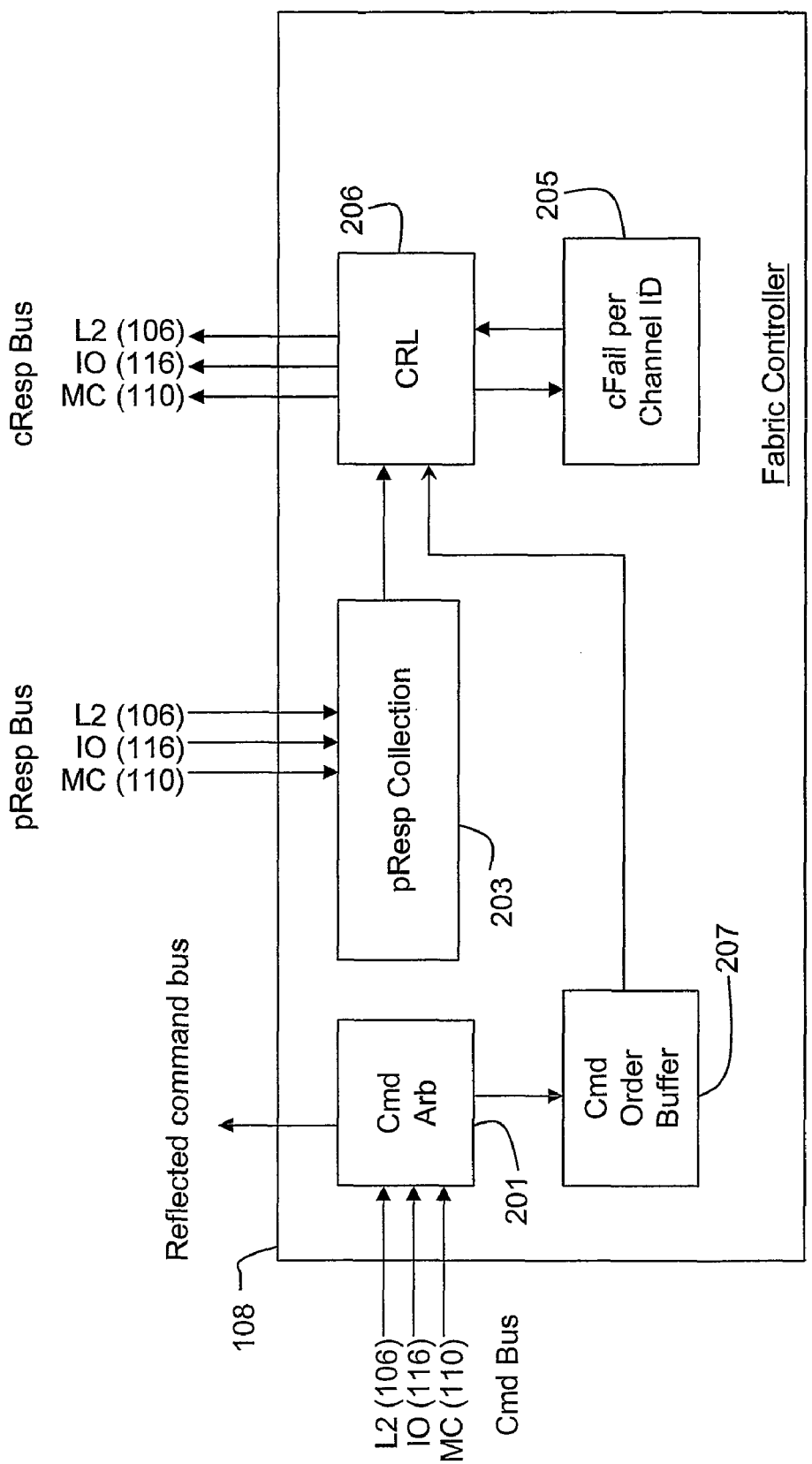
FIG. 2A is a diagram of a relevant portion of an example fabric controller that may be employed in the processor system of FIG. 1, according to various embodiments of the present disclosure.

With reference to FIG. 2A, a relevant portion of the fabric controller 108 is shown. The fabric controller 108 includes a command arbiter (Cmd Arb) 201, a command order buffer (Cmd Order Buffer) 207, partial response collection logic (pResp Collection) 203, the CRL 206, and a cFail storage (cFail per Channel ID) 205. The arbiter 201 receives commands from the L2 cache (L2) 106, the I/O controller unit (IO) 116, and the main memory controller (MC) 110 on a command bus (Cmd bus) 120. The arbiter 201 determines the next command to be reflected to all slaves in the system and passes the selected command onto a reflected command bus. Slaves respond to the command by placing a partial response on a partial response bus (pResp bus). The partial responses are collected by the partial response collection logic 203, which tracks the relationship between the command issued and the partial responses collected. The combined responses are determined and distributed using the same order as the commands were issued. The order in which the commands were issued (as well as the channel identifier and the command location indicator) is obtained from the command order buffer 207. Once all the partial responses are received by the logic 203 for the next command to be serviced by the CRL 206 (as indicated by the command order buffer 207), the partial response along with the command location indicator and the channel identifier are passed to the CRL 206. The CRL 206 accesses the cFail status of the channel identifier (collected with the command in the command order buffer 207) and forms and distributes the combined response on the combined response bus (cResp Bus). The CRL 206 determines the next state of the cFail status for the channel identifier and updates the status as is discussed in further detail herein.

Figure 3:
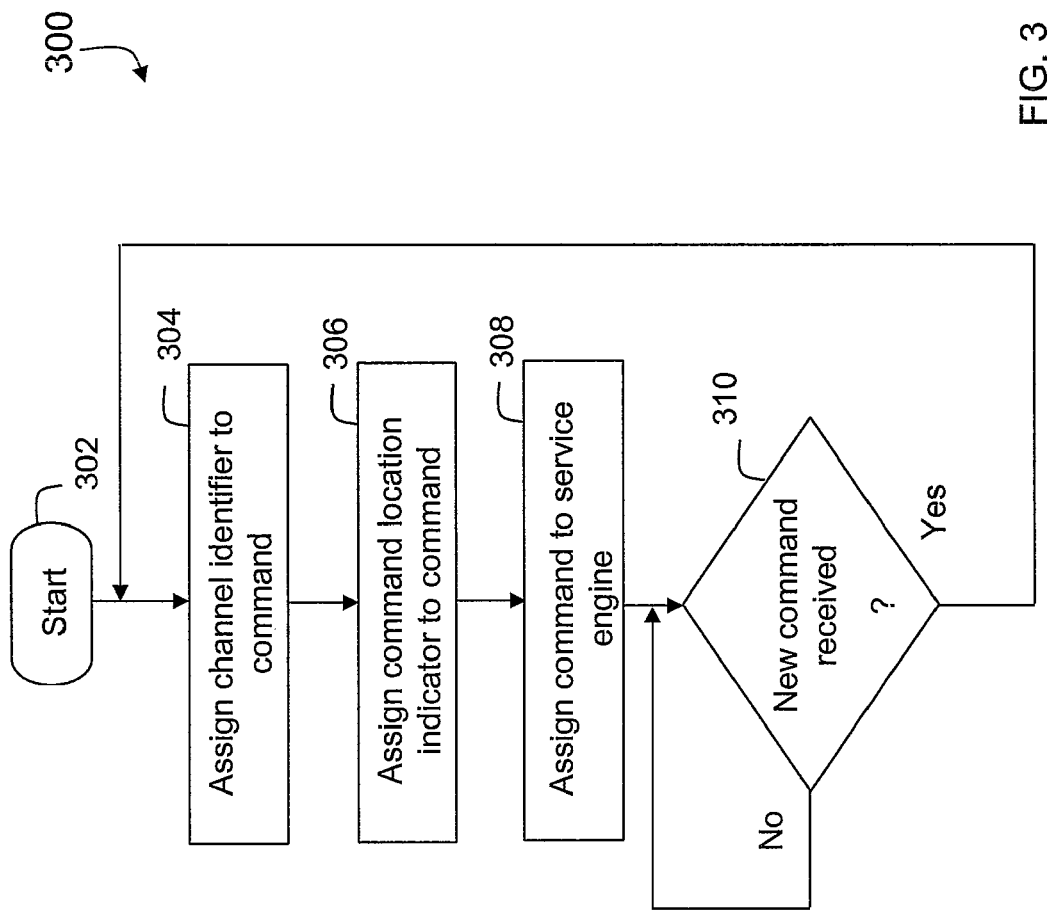
FIG. 3 is a flowchart of an example process employed by an I/O controller to assign a channel identifier and a command location indicator to a command, according to one aspect of the present disclosure.

With reference to FIG. 3 an example process 300 that is employed by an I/O controller to assign a channel identifier and a command location indicator to a command of an I/O stream (channel), according to one aspect of the present disclosure, is depicted. In block 302 the process 300 is initiated, at which point control transfers to block 304. In block 304, the I/O controller assigns a channel identifier to a command of the I/O stream. Then, in block 306, the I/O controller assigns a command location indicator to the command. As noted above, the command location indicator indicates whether the command is a start command or a continue command in the I/O stream. Next, in block 308, the I/O controller assigns the command to a service engine for later issuance. Next, in decision block 310, the I/O controller determines whether a new command is received (e.g., whether an I/O device has initiated a new I/O stream transaction that requires a write to memory). When a new command is not received in block 310, control loops on block 310 while the process 300 is active. When a new command is received in block 310, control transfers to block 304.

Figure 4:
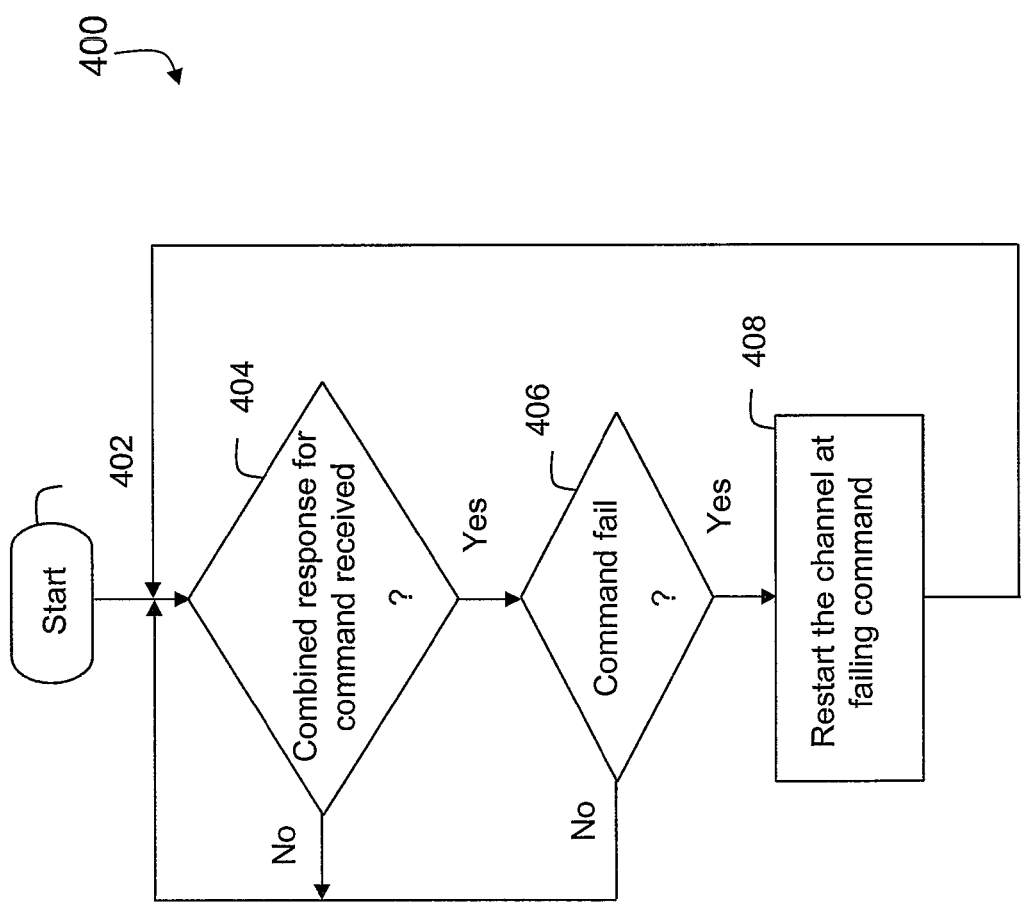
FIG. 4 is a flowchart of an example process employed by an I/O controller to restart a channel at a failing command, according to one aspect of the present disclosure.

Turning to FIG. 4, an example process 400 employed by an I/O controller to restart a channel at a failing command, according to one aspect of the present disclosure, is illustrated. The process 400 is initiated at block 402, at which point control transfers to decision block 404. In block 404, the I/O controller determines whether a combined response has been received for an issued command. If a combined response is not received in block 404, control loops on block 404. If a combined response is received in block 404, control transfers to decision block 406. In block 406, the I/O controller determines whether the received combined response indicates that a previously issued command failed. When the received combined response does not indicate that a previously issued command failed, control transfers from block 406 to block 404. When the received combined response indicates that a previously issued command failed, control transfers from block 406 to block 408. In block 408, the I/O controller restarts a channel at the failing command by changing, if required, a command location indicator of the failing command to indicate the command is a start command. After changing the command location indicator, the I/O controller issues the command. Control then transfers from block 408 to block 404 while the process 400 is active.

Figure 5:
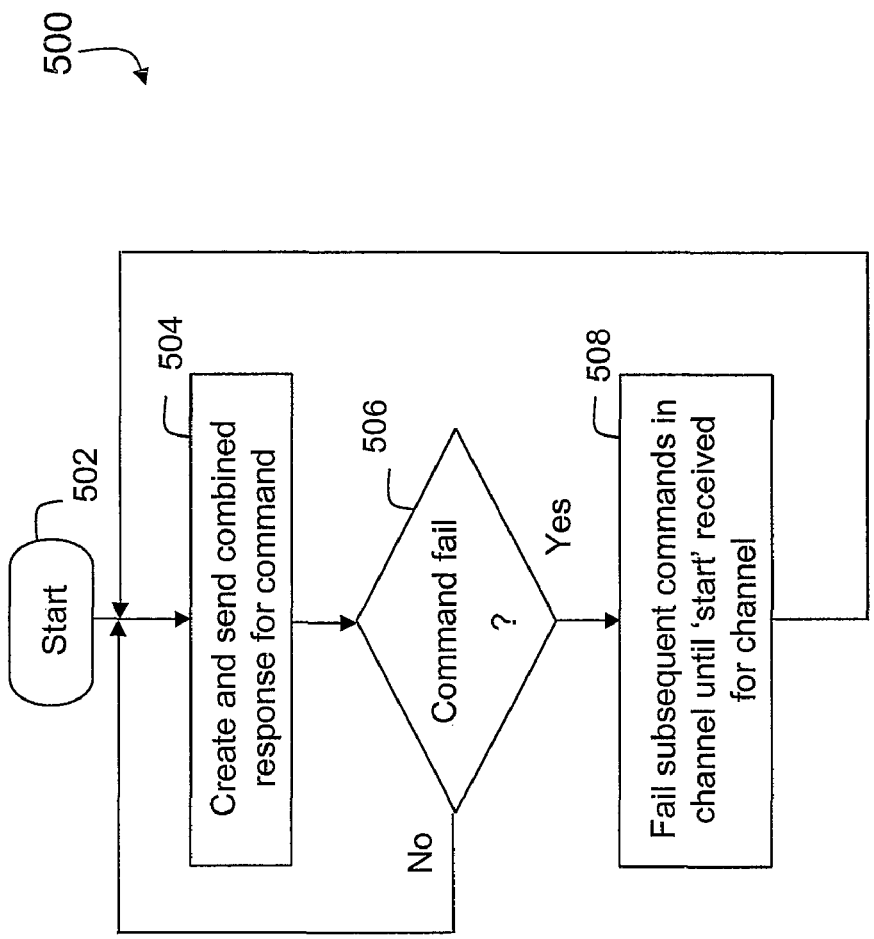
FIG. 5 is a flowchart of an example process employed by combined response logic (CRL) to fail subsequent commands in a channel following detection of a failed command, according to another aspect of the present disclosure.

With reference to FIG. 5 an example process 500 that is employed by combined response logic (CRL) to fail subsequent commands in a channel following detection of a failed command, according to another aspect of the present disclosure, is depicted. In block 502 the process 500 is initiated, at which point control transfers to block 504. In block 504, the CRL creates (from received partial responses) and sends a combined response for an outstanding command. Next, in decision block 506, the CRL determines whether the command failed (i.e., whether the combined response is a failed combined response). When the command did not fail (i.e., a slave responded that it could accept the command), control transfers from block 506 to block 504. When the command failed (i.e., no slave responded that it could accept the command), control transfers from block 506 to block 508. In block 508, the CRL fails subsequent commands in the channel (as indicated by a channel identifier) until a command in the channel is received that indicates the command is a start command (as indicated by a command location indicator). From block 508, control transfers to block 504 while the process 500 is active.

According to another aspect of the present disclosure, channel identifiers are dynamically assigned to I/O streams. As noted above, most I/O protocols have a set of ordering rules that need to be maintained. In general, I/O devices define streams such that ordering rules are applied within a stream to minimize blocking between streams. However, I/O devices can have a relatively large number of flows or streams (Nf). In general, coherent transport buses are constrained by ordering rules and coherence protocols that require conformance for each transaction to maintain memory coherence and proper program operation. Typically, the time required to resolve a coherence protocol can be large and other transactions in an I/O stream may be blocked until each previous transaction is resolved. As noted above, the addition of channel identifiers to a coherent transport bus protocol minimizes transaction blocking within a stream. That is, a channel identifier defines a stream that meets coherency and ordering requirements of a transport bus.

For a typical system, the number of channel identifiers (Nc) is less than the number of streams (Nf). In general, an I/O controller is required to maintain ordering rules of I/O devices and coherency protocols of a transport bus that carries I/O streams associated with the I/O devices. In a typical implementation, an I/O controller has a number of service engines (Ns) that is less that the number of streams (Nf). In general, the assignment of I/O streams to service engines should be done to minimize blocking between I/O streams. A first solution is to hash an I/O stream identifier into the channel identifier. While the first solution meets I/O ordering requirements, there is potential for blocking between two different I/O streams even when there are service engines and channel identifiers available. A second solution is to fix the channel identifiers to the service engines. However, the second solution causes an I/O stream to be blocked if the service engine dedicated to the I/O stream is not available.

According to this aspect of the present disclosure, an I/O controller is configured to dynamically assign a channel identifier to a new I/O stream. When a new I/O stream transaction is received and a channel identifier and a service engine are available, an I/O controller assigns a channel identifier and a service engine to the new I/O stream. When the I/O controller receives another new I/O stream transaction that is not associated with a current I/O stream and a channel identifier and a service engine are available, the new I/O stream transaction is assigned an available channel identifier and an available service engine. The assignment of new I/O stream transactions continues until all channel identifiers or all service engines are used. In this case, the technique has the capacity to support up to Nc or Ns (whichever is smaller) I/O streams. For example, when sixteen different channel identifiers and twelve different service engines are available, twelve different I/O streams may be supported. Since the channel identifiers are unique, there is no blocking between I/O streams as a result of the I/O stream/channel identifier assignment and each service engine works on a different stream.

In the case where all I/O stream transactions are associated with a single I/O stream, each of the I/O stream transactions may be assigned a different service engine and the same channel identifier. In this case, all the service engines work on the same I/O stream to maximize workload performance for the I/O stream. When a new I/O stream transaction is received and all of the service engines are assigned, the new I/O stream transaction is assigned a channel identifier and dispatched to a service engine that completes an assigned I/O stream transaction. As no service engine or channel identifier is fixed to an I/O stream, when there is a channel identifier and a service engine available, an I/O stream transaction is serviced. In this manner, the I/O controller has flexibility to assign a channel identifier and a service engine to an I/O stream such that resources may be fully utilized independent of a workload type.

Upon initialization, an I/O controller starts with a free pool of 'Ns' service engines and 'Nc' channel identifiers. When a new I/O stream transaction is received, the I/O controller determines if a free service engine is available to be assigned to the new I/O stream transaction. The I/O controller then assesses the ordering conditions of the new I/O stream transaction to determine whether the I/O stream transaction is associated with any I/O stream transaction currently being serviced by an active service engine. If the new I/O stream transaction is associated with an active I/O stream transaction, the I/O controller assigns an available service engine and the channel identifier of the active I/O stream transaction to the new I/O stream transaction. If the new I/O stream transaction is not associated with any active I/O stream transactions, the I/O controller assigns an available service engine and an available channel identifier to the new I/O stream transaction. On completion of an I/O stream transaction, the I/O controller returns a service engine associated with the completed I/O stream transaction to the free pool. If the I/O stream transaction is the last transaction of the I/O stream, the I/O controller also returns the channel identifier to the free pool.

Figure 6:
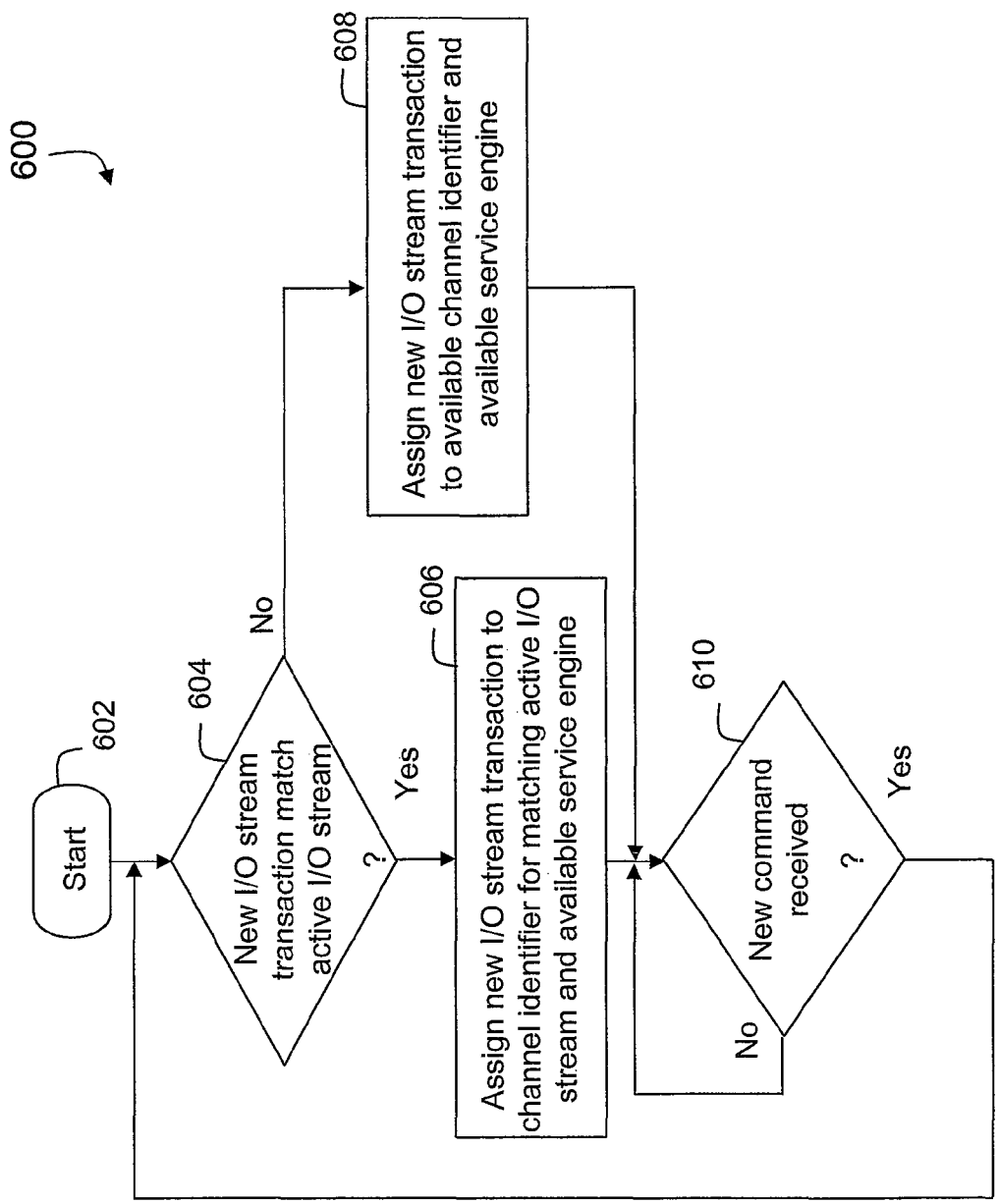
FIG. 6 is a flowchart of an example process employed by an I/O controller to assign a channel identifier and service engine to I/O stream transactions, according to yet another aspect of the present disclosure.

With reference to FIG. 6, an example process 600 that may be employed by an I/O controller to assign a channel identifier and service engine to I/O stream transactions, according to an aspect of the present disclosure, is illustrated. In block 602, the process 600 is initiated at which point control transfers to decision block 604. In block 604, the I/O controller determines whether a new I/O stream transaction (received from an I/O device) is associated with one or more active I/O streams. When the new I/O stream transaction is associated with one of the one or more active I/O streams, control transfers from block 604 to block 606. In block 606, the I/O controller assigns a channel identifier that is associated with the one of the one or more active streams and an available service engine (from a free pool) to new I/O stream transaction. Next, control transfers to decision block 610 where the I/O controller determines if a new command is received. When a new command is received in block 610, control transfers to block 604. When a new command is not received in block 610, control loops on block 610 while the process 600 is active.

When a service engine is not available from the free pool, the I/O controller waits until a free service engine is available (i.e., when an I/O stream transaction is completed and an associated service engine is returned to the free pool). When the new I/O stream transaction is not associated with one of the one or more active I/O streams, control transfers from block 604 to block 608. In block 608, the I/O controller assigns an available channel identifier (from the free pool) and an available service engine (from a free pool) to the new I/O stream transaction. When a channel identifier and/or a service engine is not available from the free pool, the I/O controller waits until a free channel identifier and/or a free service engine is available (i.e., when an active I/O stream transaction is completed and an associated channel identifier and/or an associated service engine is returned to the free pool). Following block 608, control transfers to block 610 while the process 600 is active.

Accordingly, techniques that improve performance of I/O streams that require strong memory ordering (to be architecturally compliant) have been disclosed herein. In general, the techniques can be applied to any stream of I/O commands in a pipelined system where in-order memory update is required. The techniques may be advantageously employed in architectures that employ distributed coherency hand-off mechanisms.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," (and similar terms, such as includes, including, has, having, etc.) are open-ended when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for maintaining input/output (I/O) command ordering on a bus, comprising:
   assigning, at an I/O controller, a channel identifier to I/O commands of an I/O stream, the channel identifier indicating the I/O commands belong to the I/O stream;
   assigning, at the I/O controller, a command location indicator to each of the I/O commands, the command location indicator providing an indication of which one of the I/O commands is a start command in the I/O stream and which of the I/O commands are continue commands in the I/O stream;
   issuing from the I/O controller, in a desired completion order, the I/O commands on the bus;
   preventing subsequent ones of the I/O commands in the I/O stream from completing successfully when a first one of the I/O commands does not complete successfully; and
   reissuing, from the I/O controller, the I/O commands on the bus starting at the first one of the I/O commands that did not complete successfully.

2. The method of claim 1, further comprising:
   receiving at combined response logic, from at least some slaves coupled to the bus, respective partial responses, the respective partial responses indicating whether an associated one of the at least some slaves is capable of accepting an issued one of the I/O commands; and
   distributing, to the at least some slaves, respective combined responses for issued ones of the I/O commands, wherein the respective combined responses indicate how the issued ones of the I/O commands are to be handled.

3. The method of claim 2, wherein the respective partial responses are received at the combined response logic on a partial response bus.

4. The method of claim 2, wherein the respective combined responses are sent from the combined response logic on a combined response bus.

5. The method of claim 1, wherein the preventing subsequent ones of the I/O commands in the I/O stream from completing successfully when a first one of the I/O commands does not complete successfully further comprises:
   distributing, to the at least some slaves, respective combined responses for each of the subsequent ones of the I/O commands that indicate that none of the at least some slaves is capable of accepting the subsequent ones of the I/O commands.

6. The method of claim 1, wherein the reissuing, from the I/O controller, the I/O commands on the bus at the first one of the I/O commands that did not complete successfully further comprises:
   changing, if required, the command location indicator for the first one of the I/O commands that did not complete successfully to indicate that the first one of the I/O commands that did not complete successfully is the start command in the I/O stream; and
   reissuing the start command and the I/O commands that follow the start command in the I/O stream.

7. The method of claim 1, wherein the bus is a coherent transport bus.

8. A processing system, comprising:
   an input/output (I/O) controller configured to:
      assign a channel identifier to I/O commands of an I/O stream, the channel identifier indicating the I/O commands belong to the I/O stream;
      assign a command location indicator to each of the I/O commands, the command location indicator providing an indication of which one of the I/O commands is a start command in the I/O stream and which of the I/O commands are continue commands in the I/O stream;
      issue, in a desired completion order, the I/O commands on a bus; and
      reissue the I/O commands on the bus starting at a first one of the I/O commands that did not complete successfully; and
   plurality of slaves coupled to the bus, wherein the slaves are configured to receive the I/O commands.

9. The processing system of claim 8, further comprising:
   combined response logic configured to:
      receive from at least some slaves, included in the plurality of slaves, respective partial responses, the respective partial responses indicating whether an associated one of the at least some slaves is capable of accepting an issued one of the I/O commands; and
      distribute, to the at least some slaves, respective combined responses for issued ones of the I/O commands, wherein the respective combined responses indicate how the issued one of the I/O commands are to be handled.

10. The processing system of claim 9, wherein the respective partial responses are received at the combined response logic on a partial response bus.

11. The processing system of claim 9, wherein the respective combined responses are sent from the combined response logic on a combined bus.

12. The processing system of claim 9, wherein the combined response logic is further configured to:
   distribute, to the at least some slaves, respective combined responses for each of the subsequent ones of the I/O commands that indicate that none of the at least some slaves is capable of accepting the subsequent ones of the I/O commands.

13. The processing system of claim 8, wherein the I/O controller is further configured to:
   change, if required, the command location indicator for the one of the I/O commands that did not complete successfully to indicate that the first one of the I/O commands that did not complete successfully is the start command in the I/O stream; and
   reissue the start command and the I/O commands that follow the start command in the I/O stream.

14. The processing system of claim 8, wherein the bus is a coherent transport bus.

15. The processing system of claim 8, wherein the I/O controller is further configured to:
   assign each of the I/O commands to a service engine.

16. A method for assigning input/output (I/O) stream transactions, comprising:
- determining, at an I/O controller, whether a received new I/O stream transaction is associated with one or more active I/O streams;
- assigning at the I/O controller, when the new I/O stream transaction is associated with one of the one or more active I/O streams, a first channel identifier that is associated with the one of the one or more active I/O streams and an available first service engine to the new I/O stream transaction; and
- assigning at the I/O controller, when the new I/O stream transaction is not associated with one of the one or more active I/O streams, an available second channel identifier and an available second service engine to the new I/O stream transaction.

17. The method of claim 16, further comprising:
- determining when one of the one or more active I/O streams becomes a completed I/O stream; and
- returning an assigned channel identifier and one or more assigned service engines associated with the completed I/O stream to a free pool.

18. The method of claim 16, further comprising:
- determining when an active I/O stream transaction becomes a completed I/O stream transaction; and
- returning an assigned service engine associated with the completed I/O stream transaction to a free pool.

19. The method of claim 16, wherein the first and second service engines are selected from a free pool.

20. The method of claim 16, wherein the second channel identifier is selected from a free pool.

* * * * *